May 22, 1928.                                                                    1,671,079
C. E. McMANUS
APPARATUS FOR MAKING COMPOSITION CORK RODS
Filed June 5, 1923                3 Sheets-Sheet 1
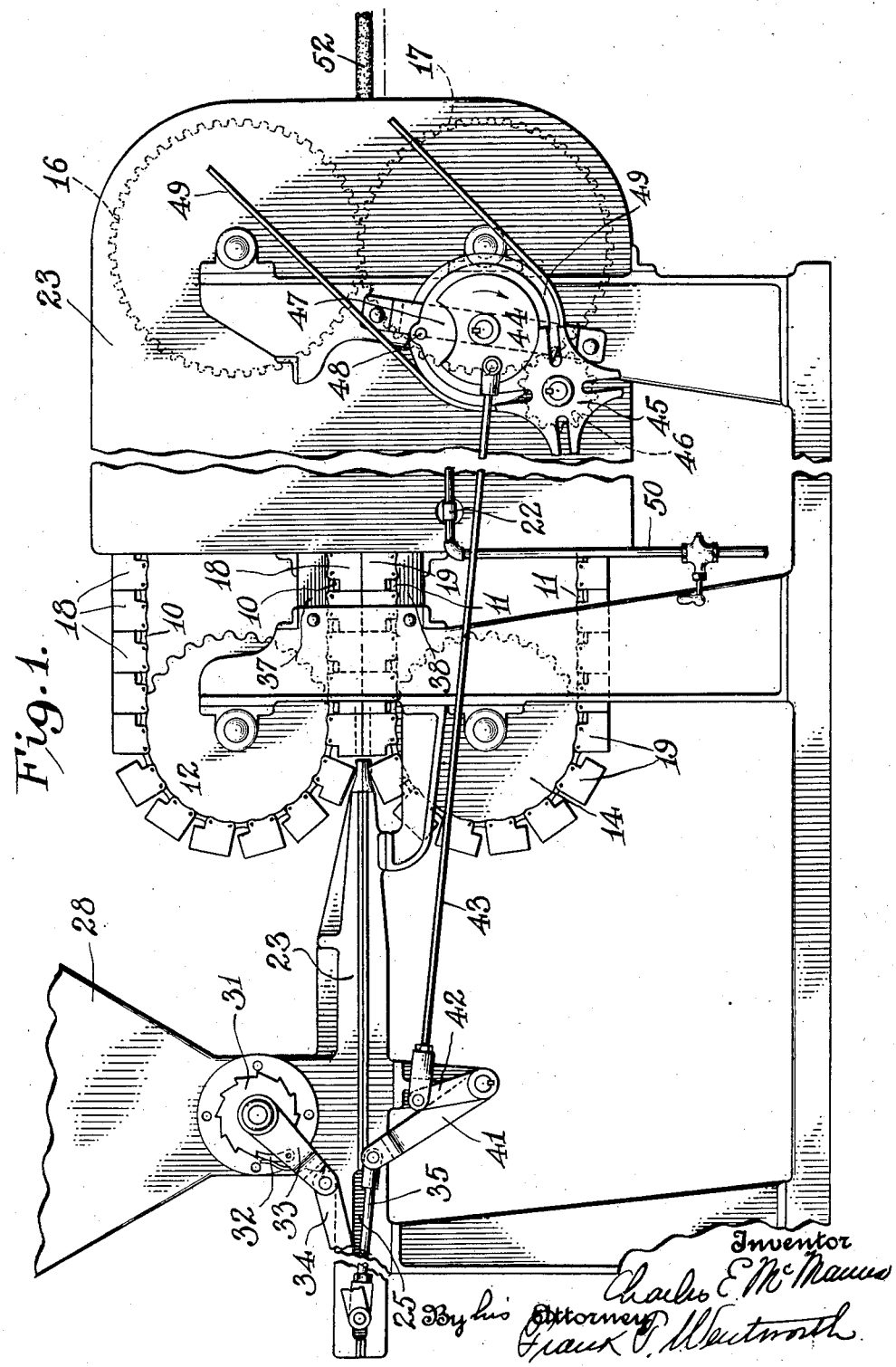

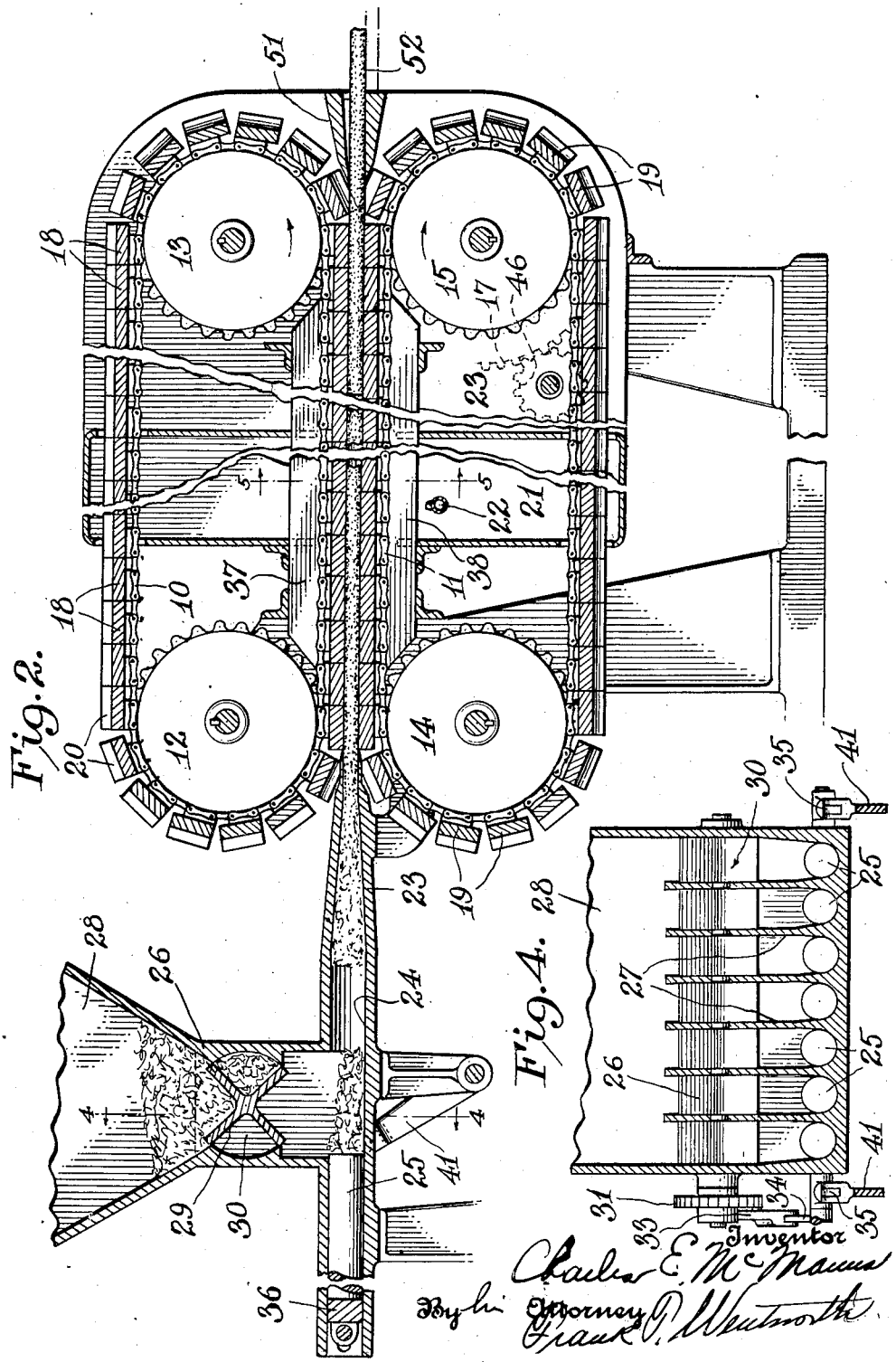

May 22, 1928.
C. E. McMANUS
1,671,079
APPARATUS FOR MAKING COMPOSITION CORK RODS
Filed June 5, 1923 3 Sheets-Sheet 3
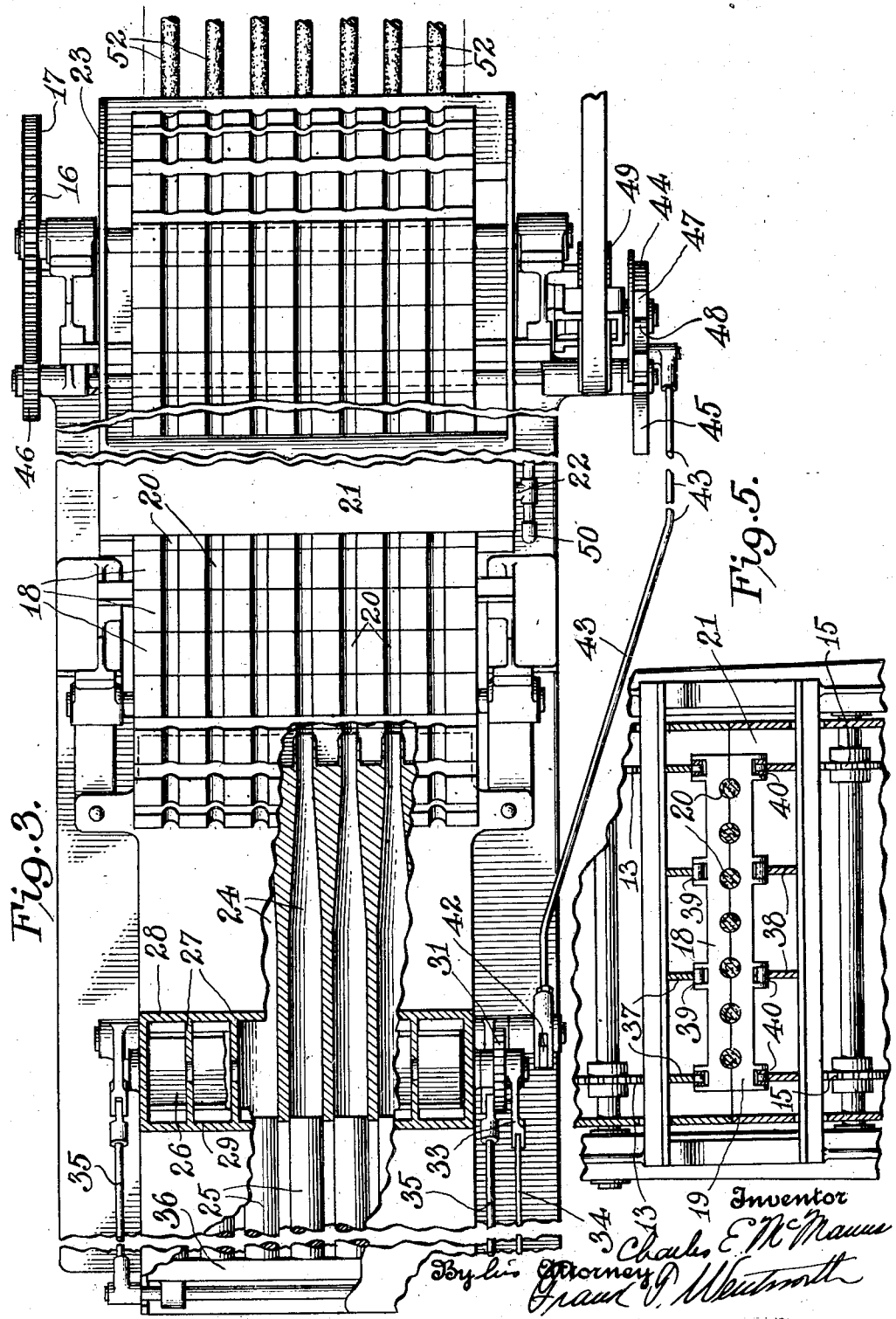

Patented May 22, 1928.

1,671,079

UNITED STATES PATENT OFFICE.

CHARLES E. McMANUS, OF NEW YORK, N. Y., ASSIGNOR TO CROWN CORK & SEAL COMPANY, INC., OF NEW YORK, N. Y., A CORPORATION OF NEW YORK.

APPARATUS FOR MAKING COMPOSITION-CORK RODS.

Application filed June 5, 1923. Serial No. 643,554.

My invention relates to apparatus for making composition cork rods, and more particularly to a mechanism by which a continuous rod of any desired length may be produced, which rod when delivered from the machine will have the various cork granules properly bonded so as to permit the rods, without further treatment, to be cut into any desired lengths, into disks for use as cushions in bottle caps, or used for various other purposes.

Heretofore in the production of composition cork rods, it has been a common practice to form thick sheets or slabs of composition cork, ordinarily not exceeding three inches in thickness; or to pack the granular cork with its thin coating of a suitable adhesive or binder, in metallic tubes. Such composition cork slabs have been formed in molds, it having been the practice after such molds and such tubes have been properly filled and packed, to subject the mold or tube and its contents to an elevated temperature to properly condition the adhesive for securing the desired bonding action as between the various cork granules, and to utilize the expansive force resulting from the application of heat to the mass of composition cork for securing the desired substantially uniform density throughout the entire mass.

Before drawing the slabs or rods from the molds or tubes, it has been the practice to cool the molds and their contents with the two-fold object of completing the setting of the adhesive of the composition, and preventing expansion of the mass when it has been relieved from the confining pressure of the mold or tube.

As above stated, it has been found impracticable to make the cork composition slabs of a thickness greater than three inches or so, and the working conditions in and about a packing machine have made it impossible to make the cork rods in tubes of a greater length than from eighteen to twenty-six inches.

Composition cork rods of the type above referred to have heretofore been extensively used in the production of cork disks for bottle closures, the rods produced in the lengths specified, being fed to disk cutting machines by which they are rapidly sliced into disks of the desired thickness. Where short rods are used, there is always some wastage owing to slight variance in the lengths of different rods, causing the production of thin or imperfect disks, and there is the further disadvantage that with the short rods, such must constantly be fed with relation to the slicing machine.

Furthermore, in the production of composition cork rods from slabs or in metal tubes, rehandling of the material during the various steps in forming the rod is required.

In an apparatus embodying my invention, I am enabled to not only form a continuous rod of composition cork as a result of the automatic functioning of the machine, but the cork composition after having been brought to the desired degree of compaction or density, by a mechanical packing and charging mechanism, is subjected to an elevated temperature while held against expansion while within a mold space, and thereafter to a relatively lower temperature so that when delivered from the machine or apparatus, a complete composition cork rod is produced.

While the apparatus is intermittently operative so far as the charging of the compacted mass of cork composition to within the mold space is concerned, the product is a continuous uninterrupted length of composition cork rod.

The structure of the apparatus is such that, if desired, a plurality of rods may be simultaneously produced, since this involves a mere duplication or extension of the mold forming element and of the mechanisms for measuring, compacting and charging the composition cork, the various granules of which, as stated, have a thin coating of suitable adhesive or binder, to within the mold space for the formation of each rod.

Whether the apparatus is constructed to make a single rod or a plurality of such rods, the mold space will be formed by a sequence of mold forming elements which are progressively and successively brought into co-operative relation with each other to form a closed space adapted to receive succeeding charges of composition cork and are maintained in this cooperative relation for a sufficient interval to permit the subjection of the contents of the mold space to the progressive action of a high temperature and of a relatively lower temperature for the purposes above referred to, said elements separating as a result of the automatic functioning of the machine after the cork composition has been subjected to the relatively low temperature, to effect the delivery of the completed rods.

Owing to the considerable expansive force developed while the cork composition within the mold forming elements is subjected to the higher temperatures, I provide means preventing the separation of the mold elements forming at the time the mold space, thus utilizing the expansive force of the obtained cork composition for securing substantially uniform density throughout the entire mass In a machine embodying my invention, it is essential that the composition cork be subjected to high temperatures for a considerable period and to a relatively lower temperature for possibly even a greater period, so that the resistance between the compacted mass of composition cork and the wall of the mold space might be relied upon to ensure the resistance to the entry of the composition cork to within the mold space, necessary to effect the compaction of the mass within this space. Preferably, however, I so construct the apparatus that these carriers will be positively held against movement during the compacting operation, and will be intermittently advanced between succeeding compacting operations, preparatory to the introduction of fresh charges of the composition cork within the mold space. Proportioning of the feeding movement of the carriers with relation to the stroke of the plunger for delivering composition cork to within the carrier is relied upon to ensure the desired mechanical compaction of the mass.

The invention consists primarily in an apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, and a heated chamber through which said mold forming elements are passed after receiving said composition cork; and in such other novel features of construction and combination of parts as are hereinafter set forth and described, and more particularly pointed out in the claims hereto appended.

Referring to the drawings,

Fig. 1 is a condensed side view of an apparatus embodying my invention, the central portion of the apparatus being broken away;

Fig. 2 is a similar view in longitudinal vertical section;

Fig. 3 is a condensed plan view of the apparatus with the compacting and charging mechanism shown partly in section;

Fig. 4 is a vertical transverse section on the line 4—4 of Fig. 2; and

Fig. 5 is a section on the line 5—5 of Fig.2.

Like numerals refer to like parts throughout the several views.

In the embodiment of my invention shown in the drawings, I employ two sets of endless carriers or chains 10 and 11, the former of which pass about two pairs of sprocket wheels 12 and 13 arranged adjacent opposite ends of the machine respectively, and the latter of which pass about two pairs of sprocket wheels 14 and 15 also arranged adjacent opposite ends of the machine. The shafts carrying the pairs of sprocket wheels 13 and 15 are preferably geared together so as to ensure the desired unidirectional and uniform movement under similar conditions of the chains of each set, these gear wheels being shown at 16 and 17 respectively.

The lower reach of the chains of the set 10 and the upper reach of the chains of the set 11, or the adjacent reaches of the carrier chains, or carriers, are, by reason of the positioning of the various sprocket wheels, maintained in substantially parallel spaced relation, it being desirable, however, to provide suitable backing members or supports for the mold forming elements carried by these chains, which will be more particularly referred to hereinafter, for the twofold object of maintaining this parallel relation and preventing the separation of mold forming elements as a result of the expansion, under heat, of the cork composition in the mold space between said elements.

Each set of the chains 10 and 11 has secured thereto a sequence of mold forming elements, those upon the chains 10 being indicated at 18 and those upon the chains 11, at 19, the parallel adjacent reaches of each set being spaced apart sufficiently to bring the faces of these elements in abutting relation as the portions of the chains carrying same pass upon said parallel reaches respectively, and to separate these elements as the reaches of the chains separate when passing about the sprocket wheels 13 and 15 respectively.

Each of these elements consist of a metallic member having at least one hemi-cylindrical recess in the face and opening through opposite ends thereof shown at 20, the open ends of the recess in each element being adapted to register with the recess in adjacent elements carried by the same carrier, and also the open top thereof registering with a similar recess in the co-operating element carried by the other carrier, so that as these elements pass to the parallel adjacent reaches of the two carriers, all elements upon these reaches will combine to form a continuous cylindrical mold space adapted to form a rod of the composition cork of the desired diameter, and of indefinite length with a continued operation of the machine.

While I have above referred to a single hemi-cylindrical depression in each of the mold forming elements, I preferably employ a considerable number of such depressions so as to simultaneously produce a number of the cork rods, which is feasible, since the necessary power for compacting the cork composition may be effectively distributed with relation to a considerable number of these mold spaces without developing excessive stresses in the operative parts of the machine or requiring excessively high power in the machine or reducing its speed of operation materially.

By mounting the mold forming elements upon carriers 10 and 11 passing about sprocket wheels as shown, said elements are permitted to have simultaneous and similar movement during the operation of the machine so that as each charge of the cork composition is delivered to within the mold space or spaces, succeeding mold forming elements will replace those utilized for forming the mold space thus filled. In this manner there is no interruption in the mold space, the effect being a continuous mold throughout the length of the adjacent parallel reaches of the carriers, the elements forming the mold space being repeatedly brought into their co-operating relation to permit the charging of the mold, and out of this relation to permit the discharge of the product.

In the formation of rods of compacted cork granules having a very thin surface coating of adhesive or binder, a liquid-tight joint is not necessary between succeeding mold forming elements or co-operating mold forming elements upon the oppositely disposed carrier, since the cork composition delivered within the mold space is never fluid. In fact a loose fit affords a vent for gases which may be released within the mold space while it is being subjected to high temperature, thus permitting greater density in the product by the elimination of small voids resulting from the presence of gas within the mold. This is true particularly as to the surface of the product, where the gas would have the greatest tendency to accumulate. This, however, is a matter of minor importance, particularly as the surface of the strip or sheet will always have more or less the surface grain of the metal of the mold.

The shafts of the sprockets 12 and sprockets 13 and sprockets 14 and the sprockets 15 are spaced a considerable distance apart in order to ensure the mold elements and the composition cork in the mold space formed thereby to be subjected to a high temperature zone for a sufficient interval to thoroughly heat the entire mass of composition cork so as to fuse or otherwise condition the adhesive or binder to cause the cork granules to be firmly cemented together. The carrier chains and the mold forming elements are also passed through a low temperature zone after leaving the high temperature zone, for an interval of time sufficient to permit the adhesive or binder to fully set, and surface shrinkage of the composition to be sufficiently great to prevent the mass expanding when relieved of the pressure from the mold forming elements. The distance between said sprockets may, according to the dimensions of the sheet, vary from sixty to one hundred and twenty-five feet.

Throughout a portion of the length of the carriers 10 and 11 and the sequence of mold forming elements 18 and 19 carried thereby, they pass through a high temperature zone indicated at 21 having suitable heating media as the gas burners 22 therein, said carriers and elements after leaving said high temperature zone passing through a low temperature zone 23 extending to the discharge point of the machine. The relative length of these high temperature and low temperature zones may be varied according to the adhesive or binder used and the diameter of the composition cork rod being formed.

It is well known to workers in the art utilizing composition cork that the time required to properly condition the adhesive or binder is such as to place a limitation upon the diameter or cross-sectional area of the mass of composition forming a cork rod, since sufficient time must be allowed for the heat to penetrate the entire mass of composition and yet the interval must not be sufficiently great to cause the heat to injure the cork granules adjacent the surface of the mass. Ordinarily the maximum diameter of a cork rod formed of such material to secure the best results should not exceed two inches and a lesser diameter is preferable.

Adjacent the sprocket wheels of each pair 12 and 14 and at a point where the elements 18 and 19 converge toward and are entering into the adjacent parallel reaches of the carrier members or chains 10 and 11, I provide a charging and compacting mechanism by which a substantially uniform quantity of the cork composition is delivered in succeeding charges to each mold space formed by the hemi-cylindrical recesses in the elements 18 and 19. This mechanism comprises a sequence of throats 23 of gradually decreasing diameter toward the discharge end thereof so as to cause the gradual compaction of the charge of composition delivered in relation to each throat, and its delivery in compacted condition to within the mold space. The end of each throat most remote from the discharge opening therein forms a cylinder 24 moving in which is a piston 25. A measuring device 26 communicates with each of said cylinders in advance of the piston 25 during each cycle of operations of the machine, the various cylinders having extensions toward said measuring device which will ensure substantially uniform distribution of the entire mass of composition delivered by said measuring device throughout the various cylinders. These extensions are indicated at 27 in the drawings.

In the accompanying drawings, I have shown merely a conventional measuring device consisting of a hopper 28 having in the outlet thereof a rotary member provided with a sequence of vanes 29 extending radially of said member, the space between said vanes being divided by partitions 30 into a sequence of compartments one above the space between adjacent extensions 27.

The member carrying the vanes 29 is actuated by an intermittent mechanism consisting of a ratchet wheel 31 acted upon by a pawl 32 carried by a swing frame 33 mounted upon the shaft of said ratchet wheel and actuated by means of a link 34 connected with a pitman 35 for actuating the pistons 25, or connected with one of the trunnions of said piston actuating means. The teeth of the ratchet wheel 31 are so set that during the compacting stroke of said piston, the measuring device will be inoperative, but will be actuated toward the end of the return or inoperative stroke of the piston. The various pistons 25 are carried by a crosshead 36 which possesses sufficient rigidity to ensure the desired uniformity of action of the various pistons.

Owing to the compressibility inherent in the material of the composition, it has a tendency, when delivered to within the mold space, to expand immediately after compaction, and when subjected to heat, this tendency is materially increased, the last condition being relied upon to secure the desired binding of the granules together and uniform density in the production. Where the mold is formed of a sequence of independent co-acting elements supported by a flexible carrier, there is naturally a tendency of these elements to separate under the expansive force exerted by the composition, which would result in an absence of the desired density, and a variance in the diameter of the rods.

To correct the above condition, I provide a plurality of backing members or supports 37—38, the former of which is adapted to engage the mold forming elements 18 while they are being passed along the lower reach of the chains 10, and the latter of which is adapted to engage the mold forming elements 19 upon the upper reach of the chains 11 parallel with the bottom reach of the chains 10. The number of such backing members or supports will vary with the width of the elements 18 and 19, the purpose of said members being to preserve the parallel relation of the co-operating elements while they are forming the mold space, and hold them against likelihood of being separated by pressure from within the mold. It is desirable to provide anti-friction rollers 39 and 40 upon each of the elements 18 and 19 respectively, adapted to engage the backing members or supports for the purpose of minimizing wear and reducing friction at this point of the machine.

The piston 25 is actuated by means of a crank shaft, one of the cranks 41 of which is connected with the pitman 35 and another crank 42 of which, is connected by the rod 43 with a crank disk 44 upon the shaft adjacent one of the pairs of sprocket wheels, the pin of said disk being so set with relation to a mechanism for actuating the carrier chains 10 and 11, as to impart a return, inoperative movement to the piston 25 while the carriers are being advanced, and a direct, compacting movement to said piston while said carriers are held against movement by said mechanism.

The mechanism for imparting an intermittent advancing movement to the carriers 10 and 11 consists of a Geneva movement, the disk 44 co-operating with a Geneva gear 45 forming one element of this movement. The shaft of said gear 45 has mounted thereon a spur gear 46 in mesh with the gear 17. The disk 44 has associated therewith a plate 47 having thereon a single pin 48 adapted to co-operate with the gear 45. The disk 44 and the plate 47 may be driven in any desired manner as by means of an ordinary belt and pulley drive indicated at 49.

At 50 I have shown the gas feed pipe for the burners within the element 21.

Adjacent the sprocket wheels 13 and 15 and the point of separation of the mold forming elements 18 and 19, I provide stripping members 51 which will ensure the separation of the completed rod 52 from the mold forming elements at this point.

The operation of the herein described mechanism is substantially as follows:—

When starting a run of the machine, the measuring device 26 will deliver a charge to each cylinder 24 in advance of the piston 25 therein, the partitions 30 and the extensions 27 ensuring a substantially uniform volume in the charges delivered into the respective cylinders. During a part of this interval, the chains 10 and 11 and the mold forming elements 18 and 19 carried thereby, are being moved by the Geneva gear mechanism, this movement being away from the throat 23 as to the two adjacent reaches of said chains and the mold forming elements carried thereby.

Upon the next cycle of the machine, the crank disk 44 and the parts actuated thereby will impart a direct reciprocation to the crosshead 36 and the various plunger pistons 25 secured thereto, or a movement of said plunger pistons toward the mold elements, thus forcing the charge of granular cork coated as herein described, toward and into the throat 23. The gradually reduced diameter of this throat will offer resistance to the movement of the greater portion of this charge so that there will be a partial compaction of the mass while within the throat. Upon the following cycle, the above operation will be repeated, the charge during this cycle and during all succeeding cycles being forced into engagement with the charge or charges previously compacted in the throat 23 and imparting movement thereto towards and to within the mold spaces formed by the hemi-cylindrical recesses 20 in the various mold forming elements 18 and 19. After the delivery of the initial charge to within the mold space, all charges will be compacted in substantially the same degree, subject, however, to slight variation because of possibility of succeeding charges delivered by the measuring device not being of exactly the same volume or bulk.

The first few charges delivered into the mold may not be sufficiently compacted to secure commercially satisfactory results, owing to the fact that the length of each charge does not exceed one and a half or two inches when compacted, and the frictional resistance between the charge and the walls of the mold may not offer that resistance necessary to secure the desired compaction in these first few charges. As the length of the material in the mold becomes greater, however, this resistance will of itself be sufficient to ensure the desired compaction of the mass so that thereafter, in the continued operation of the machine, there will be no difficulty in securing the desired initial density as a result of the mechanical compaction of the composition.

In the accompanying drawings, the scale is so small as to make an exact showing of conditions impossible, and the spacing of the parts as shown is not accurate. This, however, is a matter of mere mechanical detail.

As the various mold forming elements 18 and 19 come together in parallel planes, they will of themselves develop certain pressure upon the composition within the mold, and check any tendency it may have to expand to a material extent after each charge is filled into the mold.

The cork composition itself when delivered from the measuring device, is in loose granules coated with adhesive or binding material conditioned so as to have little or no tendency to cause the granules to cohere. The initial compaction, however, will cause the granules to cohere with sufficient strength to prevent the separation of particles therefrom in the short distance between the discharge end of the throat 23 and the point where the mold forming elements close upon the mass of compacted granules.

The various elements 18 and 19 passing along the adjacent reaches of the chain 10 or 11, (the carriers), will be advanced by a step by step movement, the quantity of movement being measured by the effective stroke of each piston or plunger 25, whether this advance be a positive mechanical movement as shown, or as a result of the movement of the compacted granular cork into the mold space as a result of the frictional engagement between this material and the walls of said space. The positive mechanical movement shown is preferable as ensuring the desired extent of compaction of all charges.

It is apparent that while the machine is in operation, the cork composition will pass in a continuous cylindrical rod to within each mold space formed by the registering recesses 20 in the elements 18 and 19 respectively, notwithstanding that the charging of the composition cork into such space is by an intermittent operation and with succeeding charges.

As the elements 18 and 19 while forming the mold space thus progress with a step by step movement, they are brought successively through the high temperature zone 21 where the heat will have the effect of properly conditioning the adhesive so as to form the desired intimate bond between the different cork granules and at the same time cause the readjustment of these granules with relation to each other as a result of expansion of the mass under heat, to secure the desired density of the product. Separation of the mold elements during this expansion is prevented by the backing members or supports 37 and 38.

As the various mold elements leave the high temperature zone 21, the cork granules will be substantially permanently bonded together, but if the mold were opened at this time, the cork rods, since the adhesive or binder has not fully set, and the entire mass is still more or less plastic, would expand so as to cause irregularity or variance in the diameter of different portions of the rod and variance in the density of the composition forming same. It is for this reason that I provide a low temperature zone 23 through which the mold elements are carried so as to permit the partial cooling of the mass to cause it to take a more or less permanent set and permit shrinkage, particularly of the portion of the composition adjacent the surface of the rod, with the twofold object of utilizing this portion of the rod to check the tendency of the entire mass to expand and at the same time facilitate the separation of the mold forming elements without likelihood of the surface of the composition adhering thereto.

It is apparent that the mass of composition cork will be discharged from the apparatus in the form of a continuous rod or plurality of rods, each having a high degree of flexibility and each being of substantially uniform density throughout. The material of such rods will have none of those voids characteristic of natural cork, so that they may be readily separated into short cylinders or disks, each of which will be free from surface voids or from openings extending entirely therethrough, thus particularly adapting the product for use in the production of cushion disks for bottle caps, bottle stoppers and various purposes in the arts where a considerable length of rod is required.

While the movement of the mold forming elements 18 and 19 away from each other as a result of the passage of the carrier chains 10 and 11 of each pair about the sprocket wheels 13 and 15, will ordinarily ensure the free movement of the compacted, vulcanized or baked and partially cooled rod or rods 52 from the machine, the stripper members 51 are provided to ensure a complete separation of the rods from the succeeding elements 18 and 19.

It is not my intention to limit the invention to the precise details of construction shown in the accompanying drawings, it being apparent that such may be varied while still permitting the production of a continuous rod or rods of composition cork as a result of intermittently movable, separable mold forming elements mounted upon continuous carriers, the adjacent reaches of said carriers being passed progressively through high and low temperature zones for securing the effects as above stated.

Having described the invention, what I claim as new and desire to have protected by Letters Patent, is:—

1. An apparatus of the character described, embodying therein two oppositely disposed endless carriers, the adjacent reaches of which extend in substantially parallel relation to each other, a sequence of independent mold forming elements supported by said carriers respectively, each of said elements having a semi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, and a heated chamber through which said mold forming elements are passed after receiving said composition cork.

2. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, two chambers through which said mold forming elements are successively passed after receiving said composition cork, and means maintaining an elevated temperature in the first of said chambers, whereby composition cork within said mold forming elements will be successively subjected to a high temperature and to a relatively lower temperature.

3. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, means whereby said carriers are positively held against movement while said last named means are operative to deliver composition cork to within the mold space, and a heated chamber through which said mold forming elements are passed after receiving said composition cork.

4. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, a hopper for composition cork, a measuring device adapted to deliver cork from said hopper, a cylinder with which said measuring device communicates, a throat leading from said cylinder and opening into one end of the mold space formed by said mold forming elements, a piston mounted in said cylinder, means whereby said carriers may have simultaneous, similar movement imparted thereto, and a heated chamber through which said mold forming elements are passed after receiving said composition cork.

5. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, driving means for said carriers including therein rotatable members about which said carriers respectively pass, gears connecting members for the oppositely disposed carriers, a driving gearing operative upon one of said last named gears consisting of a Geneva gear movement, and means actuating one of the elements of said Geneva gear movement, whereby said carriers are positively held against movement except during a part of each revolution of said driving means, means synchronized with the actuation of said Geneva gear movement for actuating the means for compacting and delivering composition cork, and a heated chamber through which said mold forming elements are passed after receiving said composition cork.

6. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, a hopper for composition cork, a measuring device adapted to deliver cork from said hopper, a cylinder with which said measuring device communicates, a throat leading from said cylinder and opening into one end of the mold space formed by said mold forming elements, a piston mounted in said cylinder, driving means for said carriers including therein rotatable members about which said carriers respectively pass, gears connecting members for the oppositely disposed carriers, a driving gearing operative upon one of said last named gears consisting of a Geneva gear movement, and means actuating one of the elements of said Geneva gear movement, whereby said carriers are positively held against movement except during a part of each revolution of said driving means, means synchronized with the actuation of said Geneva gear movement for actuating said piston and said measuring device, and a heated chamber through which said mold forming elements are passed after receiving said composition cork.

7. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, a heated chamber through which said mold forming elements are passed after receiving said composition cork, and backing members operative upon said mold forming elements while within said heated chamber to prevent separation of said elements as a result of expansion of the composition cork within the mold space.

8. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, means compacting and delivering composition cork to within said mold space, two chambers through which said mold forming elements are successively passed after receiving said composition cork, means maintaining an elevated temperature in the first of said chambers, whereby composition cork within said mold forming elements will be successively subjected to a high temperature and to a relatively lower temperature, and backing members operative upon said mold forming elements while within said heated chamber to prevent separation of said elements as a result of expansion of the composition cork within the mold space.

9. An apparatus of the character described, embodying therein two oppositely disposed endless carriers, the adjacent reaches of which extend in substantially parallel relation to each other, a sequence of independent mold forming elements supported by said carriers respectively, each of said elements having a hemi-cylindrical depression therein, the depressions in each of said elements registering with those of the adjacent elements upon the same carrier, and upon the adjacent reach of the oppositely disposed carrier, whereby said elements are brought together upon the parallel reaches of said carriers, and a continuous cylindrical mold space is formed, means whereby said carriers may have simultaneous, similar movement imparted thereto, a hopper for composition cork, a measuring device adapted to deliver cork from said hopper, a cylinder with which said measuring device communicates, a throat leading from said cylinder and opening into end of the mold space formed by said mold forming elements, a piston mounted in said cylinder, means whereby said carriers are positively held against movement while said piston is operative to deliver composition cork to within the mold space and receive movement while said cylinder is inoperative to so compact and deliver the composition cork, two chambers through which said mold forming elements are successively passed after receiving said composition cork, and means maintaining an elevated temperature in the first of said chambers whereby composition cork within said mold forming elements will be successively subjected to a high temperature and to a relatively lower temperature.

10. An apparatus of the character described, embodying therein two oppositely disposed endless carriers, the adjacent reaches of which extend in substantially parallel relation to each other, a sequence of independent mold forming elements supported by said carriers respectively, each of said elements having a plurality of hemi-cylindrical depressions therein, each depression in each of said elements registering with a depression of an adjacent element upon the same carrier, and upon the adjacent reach of the oppositely disposed carrier, whereby said elements are brought together upon the parallel reaches of said carriers to form a plurality of parallel, continuous cylindrical mold spaces, means whereby said carriers may have simultaneous similar movement imparted thereto, a plurality of throats adapted to deliver composition cork into said mold spaces respectively, a cylinder communicating with each of said throats, a plurality of pistons one in each of said cylinders, means whereby a charge of cork is simultaneously delivered to each of said cylinders, means whereby said pistons are simultaneously reciprocated to the same extent, two chambers through which said mold forming elements are successively passed after receiving said composition cork, means maintaining an elevated temperature in the first of said chambers, whereby composition cork within said mold forming elements will be successively subjected to a high temperature and to a relatively lower temperature, and backing members operative upon said mold forming elements while within said heated chamber to prevent separation of said elements as a result of expansion of the composition cork within the mold space.

11. An apparatus of the character described, embodying therein a sequence of independent mold forming elements, means whereby said elements are supported in endless abutting relation so that they may have simultaneous similar movement imparted thereto, a second sequence of independent mold forming elements co-operating with the elements of said first named sequence, means supporting the elements of said second sequence in endless abutting relation, portions of the means supporting the elements of each sequence extending in substantially parallel relation to the other, whereby a continuous mold space is formed by said elements while in said parallel relation, means compacting and delivering composition cork to within said mold space, and a heated chamber through which said mold forming elements are passed after receiving said composition cork.

12. An apparatus of the character described, embodying therein a sequence of independent mold forming elements, means whereby said elements are supported in endless abutting relation so that they may have simultaneous similar movement imparted thereto, a second sequence of independent mold forming elements co-operating with the elements of said first named sequence, means supporting the elements of said second sequence in endless abutting relation, portions of the means supporting the elements of each sequence extending in substantially parallel relation to the other, whereby a continuous mold space is formed by said elements while in said parallel relation, means compacting and delivering composition cork to within said mold space, two chambers through which said mold forming elements are successively passed after receiving said composition cork, means maintaining an elevated temperature in the first of said chambers, whereby composition cork within said mold forming elements will be successively subjected to a high temperature and to a relatively lower temperature, and backing members operative upon said mold forming elements while the cork composition therein is heated, to prevent separation of said elements as a result of expansion of the composition cork.

13. In a cork packing machine, a movable mold comprising a plurality of separable tube forming links, a granular cork hopper, a casing for said hopper, a plunger operating through said casing and adapted to push the cork from the hopper into the mold and an extended portion on said casing, the end of said portion closely fitting into the receiving end of said mold, whereby rearward movement of the cork granules is prevented.

14. In an apparatus for extruding cork, the combination with two sets of mold sections, of means for continuously bringing said two sets of mold sections into abutting mold-forming relation so as to obtain a continuous mold through which the cork is extruded, and a reciprocable plunger for feeding comminuted cork to said mold.

15. In an apparatus for extruding cork, the combination with two sets of mold sections, of means for continuously bringing said two sets of mold sections into abutting mold-forming relation, holding the same in such abutting positions and thereafter separating the same, whereby a continuous mold is obtained through which the cork is extruded, and a reciprocable plunger for feeding comminuted cork to said mold.

16. In an apparatus for extruding cork, the combination with two sets of interconnected mold sections, of means for continuously bringing said two sets of mold sections into abutting mold-forming relation so as to obtain a continuous mold through which the cork is extruded, and a reciprocable plunger for feeding comminuted cork to said mold.

17. In an apparatus for extruding cork, the combination with two sets of mold sections, each set being interconnected to form an endless chain, means for actuating said endless chains to bring said two sets of mold sections into abutting mold-forming relation so as to obtain a continuous mold through which the cork is extruded, and a reciprocable plunger for feeding comminuted cork to said mold.

18. An apparatus according to claim 17, comprising means for preventing transverse movement of the two sets of mold sections while in mold-forming relation.

19. An apparatus according to claim 14, comprising means for preventing transverse movement of the two sets of mold sections while in mold-forming relation.

20. An apparatus according to claim 15, comprising means for preventing transverse movement of the two sets of mold sections while in mold-forming relation.

21. An apparatus according to claim 14, comprising means for heating said mold sections during a portion of the time in which they are held in mold-forming relation.

22. An apparatus according to claim 15, comprising means for heating said mold sections during a portion of the time in which they are held in mold-forming relation.

23. An apparatus according to claim 17, comprising means for preventing transverse movement of the two sets of mold sections while in mold-forming relation and means for heating said mold sections during a portion of the time in which they are held in mold-forming relation.

24. In an apparatus for extruding cork, the combination with two sets of hemi-cylindrical mold sections, of means for continuously bringing said two sets of mold sections into abutting cylindrical tube-forming relation so as to obtain a continuous cylindrical tube through which the cork is extruded, and a reciprocable plunger for feeding comminuted cork through said tube.

25. In a cork packing machine, a self-forming mold, a plunger for packing said mold adjacent its point of formation and means for advancing said mold independently of the plunger whereby the density of the cork packing may be controlled.

26. In a cork packing machine, a mold, a plunger for packing the mold, means for advancing the mold intermittently, means for operating the plunger, said plunger operating means also operating the mold advancing means.

In witness whereof I have hereunto affixed my signature this 24th day of April, 1923.

CHARLES E. McMANUS.